US005858223A

United States Patent [19]

Stadtmuller et al.

[11] Patent Number: 5,858,223

[45] Date of Patent: Jan. 12, 1999

[54] MAGNETIC SEPARATORS

[75] Inventors: Adam Antoni Stadtmuller; Josef Boehm, both of Slough; David Linkens, Epsom, all of Great Britain

[73] Assignee: Carpco, Inc., Jacksonville, Fla.

[21] Appl. No.: 614,255

[22] Filed: Mar. 12, 1996

Related U.S. Application Data

[63] Continuation-in-part of Ser. No. 119,232, filed as PCT/GB92/00548 Mar. 25, 1992, abandoned.

[30] Foreign Application Priority Data

| | | | |
|---|---|---|---|
| Mar. 25, 1991 | [GB] | United Kingdom | 9106284 |
| Mar. 25, 1992 | [WO] | WIPO | PCT/GB92/00548 |

[51] Int. Cl.[6] .......... B01D 35/06

[52] U.S. Cl. .......... 210/222; 210/344; 96/2

[58] Field of Search .......... 210/222, 344, 210/492; 209/224, 232; 96/1, 2

[56] References Cited

U.S. PATENT DOCUMENTS

| | | | |
|---|---|---|---|
| 311,257 | 1/1885 | Piefke | 210/344 |
| 3,979,288 | 9/1976 | Heitmann et al. | 210/222 |
| 4,033,864 | 7/1977 | Nolan et al. | 210/222 |
| 4,046,681 | 9/1977 | Marston et al. | 210/222 |
| 4,079,002 | 3/1978 | Iannicelli | 210/222 |
| 4,124,503 | 11/1978 | Watson | 210/222 |
| 5,122,269 | 6/1992 | De Reuver | 210/222 |

FOREIGN PATENT DOCUMENTS

| | | | |
|---|---|---|---|
| 11305 | 1/1910 | France | 210/344 |
| 1388779 | 3/1975 | United Kingdom . | |

OTHER PUBLICATIONS

M.Parker, "Recent Developments in High Field Magnetic Separation", Univ. of Salford, U.K., date unknown.

*Primary Examiner*—Matthew O. Savage
*Attorney, Agent, or Firm*—Myers, Liniak & Berenato

[57] ABSTRACT

A magnetic separator for separating magnetizable particles from a fluid is described. The separator is of the type comprising a separating chamber having an inlet and an outlet with means for establishing an axial magnetic field within the chamber. Two or matrix elements are positioned side-by-side axially along the chamber. Fluid separation means is provided for dividing a stream of fluid containing magnetizable particles supplied to the inlet of the chamber into two or more portions and directions each portion axially through a respective matrix element and thence to the outlet. For a given slurry feed amount, a greater matrix element area is provided. The matrix elements may be in the form of spaced annuli, the fluid portions being fed radially between adjacent first and second elements, axially through both elements and then radially between each element and an element adjacent thereto.

7 Claims, 7 Drawing Sheets

FIG. 1
PRIOR ART
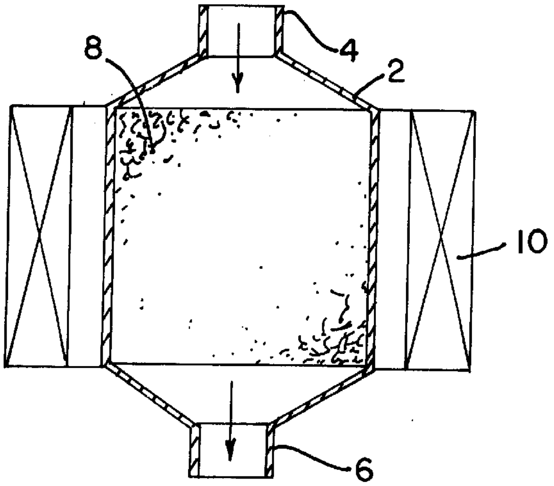
FIG. 3
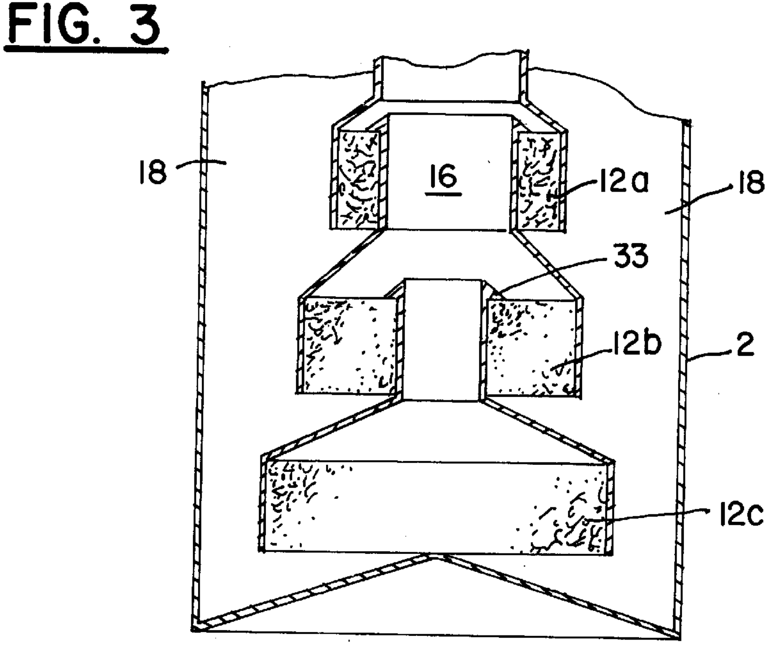
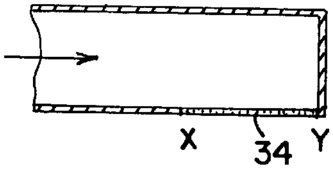
FIG. 4A
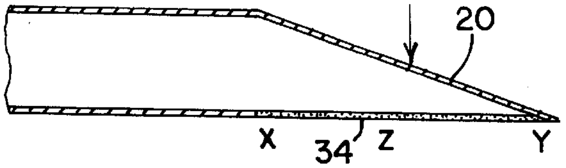
FIG. 4B

MAGNETIC SEPARATORS

RELATED APPLICATION

This application is a continuation-in-part of U.S. Ser. No. 08/119,232, filed as PCT/GB92/00548 Mar. 25, 1992, now abandoned.

FIELD OF INVENTION

This invention relates to magnetic separation devices, in particular to the type of device in which magnetic particles are removed from a stream of material by feeding the stream on or through stationary magnetic material, the magnetic particles being held or "trapped" by the magnetic material and thereby extracted from the stream.

BACKGROUND OF INVENTION

One form of magnetic separation device which functions by magnetic particle entrapment is generally referred to as a High Gradient Magnetic Separator or HGMS. An HGMS comprises a canister containing a liquid permeable packing of magnetizable material between the canister inlet and outlet. The packing material may be paramagnetic or ferromagnetic and may be in particulate or filamentary form, for example, it may comprise wire wool, wire mesh, knitted mesh or steel balls. The packing may be in the form of a single block which essentially fills the canister or it may be other forms, for example, concentric cylinders or rectangular plates. The term "matrix" is generally employed to refer to the packing and this is used, in the case where the packing is divided into a number of elements, by some in the industry to refer to the individual elements and by others to refer to the totality of the packing. The term will be employed herein in the latter way.

The canister is surrounded by a magnet which serves to magnetize the matrix contained therein, the magnet generally being arranged to provide a magnetic field in the direction of the canister axis. With the matrix magnetized, a slurry of fine mineral ore or clay in water is fed into the inlet of the canister. As the slurry passes through the canister the magnetizable particles in the slurry are magnetized and captured on the matrix. Eventually, the matrix becomes substantially completely filled with magnetizable particles and the rate of capture decreases so that the quantity of magnetizable particles in the treated slurry leaving the outlet of the canister reaches an unacceptably high level. The slurry feed is then stopped and the canister rinsed with water to remove all non-magnetic material from the matrix. The magnetic field is reduced to zero and the matrix is scoured with high-speed wash water to remove the magnetizable particles therefrom.

The processing capacity of an HGMS is proportional to the product of the surface areas of the matrix to which the slurry is fed and the velocity of the slurry through the matrix. It is also dependent on the depth of the matrix since the greater this is, the more chance that a magnetizable particle will be trapped. However increasing the length beyond the limit required to ensure satisfactory performance, that is, to give a reasonable chance of particle capture, does not enhance the capacity of the separator. An increase in slurry velocity will increase capacity but will also cause a corresponding decrease in the possibility of capture of a magnetizable particle. Thus, the velocity can only be increased to a certain limit since, beyond this, the quality of product will suffer.

Accordingly, efforts to increase capacity have been centred on designing HGMS with large matrix surface areas.

This has led to the employment of a single element matrix of large diameter with a relatively short axial length located within a correspondingly shaped magnet. With electromagnets, pole pieces are arranged at each end of the canister around the inlet and outlet thereto to concentrate the flow of magnetic flux longitudinally through the matrix. The limiting factor on the size of matrix elements which can be used for such arrangement is the maximum depth of the magnetic field which it is possible to achieve.

A problem with the arrangement described above is that it cannot be employed efficiently with the process described in U.S. Pat. No. 4,124,503. In that process, two canisters are provided, alternatively movable into a magnetised zone. While one of the canister is in this zone, the other is being rinsed and washed. This process is very economical and practical since it allows almost continuous treatment of feed slurry, the feed being stopped only when the canisters are actually being moved. For best results with an HGMS, a super-conducting magnet is employed and this is indicated to be preferred for the process of U.S. Pat. No. 4,124,503. It is the use of a super-conducting magnet and the need for canisters which can be moved into and out of a magnetic field which prevents a short, large diameter matrix being employed efficiently in the process of U.S. Pat. No. 4,124,503. There are two reasons why this is so as follows.

Firstly, a uniform field is required for good results and this can only be obtained with the short, large diameter magnet, which is necessary to use with a short, large diameter matrix, by employing iron pole pieces. However, the use of such iron pole pieces means that the canisters cannot be readily moved into and out of the magnetic coil which is an essential feature of the operation of the process of U.S. Pat. No. 4,124,503. Secondly, super-conducting magnetic design favours a coil whose length is about twice its diameter, this arrangement providing a laterally uniform magnetic field without the need for pole pieces. This form of super-conducting magnetic provides a higher field than is achievable with a shorter magnet with iron pole pieces since, in the latter case, a limit is set by the fact that iron saturates at a magnetic flux equivalent to approximately 2 Tesla whereas in the former case a uniform field is readily achievable with magnetic fluxes equivalent to about 5 Tesla. However, of course, this form of super-conducting magnet dictates that the matrix is also of a length twice its diameter, i.e., the complete opposite to the desired matrix aspect ratio discussed above.

In order to increase effective surface area, within the constraints provided by the use of super-conductive magnet and the need for the canisters to be removable from the magnetic, U.S. Pat. No. 4,124,503 proposes employing a matrix in the form of a tube, the slurry being fed into the centre of the tube and then radially outwards therethrough. Other suggestions for maximising the matrix surface area are, for example, to provide multiple thin cross-section matrix elements arranged parallel to the axis of the canister in the form of two rectangular sections, a series of concentric tubes or as an array of rectangular sections. However, all these arrangements suffer from the deficiency that the flow of the slurry through the matrix is transverse to the axis of the canister and hence to the direction of the magnetic field. It is known that the effectiveness of the capture of magnetizable particles is less when the slurry is fed through the matrix transverse to the magnetic field than when it is fed parallel thereto.

GB 1388779 describes a separator with plural matrix elements stacked in a chamber and feed means for feeding fluid through the elements in a direction parallel to the magnetic field within the chamber. The feed means comprises a separate supply pipe for each matrix element which feeds a flow control member positioned above the element. Each flow control member includes a distribution network having a central chamber and plural radial passages for feeding the element therebelow and a collection network of similar form for receipt of slurry from the element thereabove. The arrangement is relatively complicated and vulnerable to failure by blockage of the radial passages.

It is an object of the invention to provide a magnetic separator which is simple in form but achieves equal if not better results than known separators.

SUMMARY OF INVENTION

A magnetic separator for separating magnetizable particles from a fluid comprising a canister for defining a separating chamber, said canister having a longitudinal axis, a first end, a second end, an inlet at said first end, an outlet and a sidewall surrounding said axis, said sidewall having an interior surface; means for establishing an axial magnetic field within the chamber; two or more annular matrix elements, each of said matrix elements including central axes aligned with said axis of said chamber, said matrix elements being positioned within the canister in a spaced parallel relationship between said first and second ends of said canister, along the longitudinal axis of said canister; and a flow separation means for dividing a stream of fluid containing magnetizable particles supplied to the inlet into two or more portions, said flow separation means comprising a supply pipe for feeding fluid to said matrix elements from said inlet, and a return pipe for directing fluid from said matrix elements to said outlet, one of said supply pipe and said return pipe comprising a channel passing centrally through each of said matrix elements with the exception of the matrix element adjacent the second end of the canister, and the other of said supply pipe and said return pipe comprising an annular channel surrounding a radially exterior surface of said matrix elements and positioned radially between the interior surface of said sidewall and the radially exterior surface of said matrix elements, supply branch passageways extending from said supply pipe to the spaces between alternate pairs of matrix elements and return branch passageways extending from the spaces between alternate pairs of matrix elements to said return pipe, said return branch passageways being offset along said longitudinal axis of said canister from said supply branch passageways by one matrix element, said supply branch passageways each directing a portion of said stream from said supply pipe axially through the matrix elements either side thereof and said return branch passageways directing fluid which has passed through the matrix elements either side thereof to said return pipe.

The advantage of this arrangement is that by providing two or more matrix elements and feeding a portion of the slurry to each, for a given slurry feed amount, a greater matrix element area is provided. As noted above processing capacity is proportional to, inter alia, the matrix area and thus, by increasing the area, the processing capacity is increased. Furthermore, the slurry is fed through the matrix elements in an axial direction, that is, parallel to the magnetic axis field which, as noted above, gives the greatest effectiveness of capture of magnetizable particles. The overall result is that a better quality, in terms of removal of magnetizable particles from the slurry, and higher capacity process can be achieved.

The total matrix volume will obviously be less than when a single matrix element is employed which essentially fills the chamber. However, the loss in matrix volume is more than compensated for by the increased matrix area and effectiveness of capture due to the feed being parallel to the magnetic field.

As noted above, the multiple matrix elements present a large matrix area to the incoming feed slurry. The fact that the elements are in side-by-side however means that, overall, the arrangement is one in which the length of the matrix, and hence that of the chamber, can readily be made greater than its diameter. This makes the arrangement particularly suitable for use with a super-conducting magnet.

A further advantage of the arrangement of the matrix elements is that the magnetic separator can be modified to cope with slurries which contain differing amounts of magnetizable particles simply by changing the number of matrix elements and/or the depth of each element. The canister and, more importantly since this is the most expensive component, the magnet stay the same. Thus the arrangement is very versatile but in an extremely economic way.

Moreover the arrangement allows simple predictions of capacity from laboratory scale experiments. Such experiments are generally performed on a separator with a single matrix when the flow is parallel to the direction of the magnetic field. From the results of such experiments a reasonably accurate prediction of the capacity of the separator of this invention could be made simply by multiplying the measured capacity by the number of matrix elements employed in the separator. Conversely the measured capacity can be used to calculate the number of elements required for a particular desired operational capacity.

The flow separation means is preferably arranged to divide the stream into equal portions. This allows each matrix element to be used to its full capacity since it ensures that one element is not filled with magnetizable particles before the others. The flow separation means comprises a supply pipe and a return pipe, one of which comprises a cylindrical channel which passes through the matrix elements whilst the other of which comprises an annular tube surrounding the matrix elements. In either case, the internal cross-sections of the supply and return pipes may differ along the length thereof. The advantage of providing the supply and return pipes with internal cross-sections which differ along their lengths is that, by suitably arranging the internal cross-section, one can ensure that the velocity and pressure of the feed slurry is maintained constant along the length of the supply and return pipes, which ensures that the portions into which the stream of slurry is divided are equal in size.

A flow divider element may be provided within the supply and return pipes co-axially therewith, the divider element, in the case where the pipe is a cylindrical channel, comprising a rod the diameter of which differs along its length whereby the internal cross-section of the pipe also differs along its length. In the case where the pipe is an annular tube, the element will be attached to the interior of the external wall thereof and will comprise a tubular liner, the internal diameter of which differs along its length whereby the internal cross-section of the pipe also differs along its length.

The flow divider element of the supply pipe or the return pipe, suitably comprises n−1 regions for a separator with n matrix elements, a region being associated with each matrix element below the matrix element which is adjacent from the inlet, the diameter of each region along the canister from the inlet being greater than the preceding region, the divider element expanding smoothly between each region thereof. With a supply pipe or a return pipe of cross-sectional area x, the region of the divider element nearest the inlet may be 1/(n−1)x and the area of each succeeding region may be greater by 1/(n−1)x. This formation of divider element will result in a supply pipe, or return pipe, with an internal cross-sectional area which decreases in steps along its length from the inlet. The decrease in cross-sectional area will result in slurry fed a long the pipe having constant velocity. This result is important since it ensures that equal portions of slurry are fed to each matrix element and thus that each element is equally loaded with magnetisable particles.

Alternatively, the internal cross-sections of the supply and return pipes may be varied by varying the size of the matrix elements, in particular by making these with different inner and outer radii. The inner radius of successive matrix elements may progressively decrease, to correspondingly decrease the internal cross-section of the central channel, with the last matrix element having a zero inner diameter i.e. being circular rather than annular. The outer diameters of successive matrix elements may, in a similar fashion, progressively increase to give a corresponding decrease in the internal cross-section of the annular tube. The result again will be that slurry fed along the pipes will have constant velocity and accordingly equal amounts of slurry will be fed to each matrix element. The advantage of this flow control arrangement is that the total matrix volume is greater but it does impose a requirement for each matrix element to be individually made.

Guide elements, suitably in the form of a ring of right-triangular cross-section, may be provided at the inner and/or outer edge of each matrix element to improve the flow and prevent it from becoming turbulent.

An annular space may be provided between each adjacent pair of matrix elements which opens into the supply pipe and the return pipe, each annular space being divided, by a plate, into a feed passageway for one adjacent element and a return passage way for the other adjacent element. The plate or plates may be positioned at an angle to, and extend between, the faces of the matrix elements either side of the annular space. This ensures that the pressure of fluid supplied to a matrix element will be relatively constant across the face of that element which will give uniform flow through the element and consequent optimal results.

Additionally, or alternatively, to the use of the angled plates, a porous plate may be provided across the faces of the matrix elements to which slurry is fed and from which it is returned. The use of a porous plate mitigates the effect of any pressure difference existing across the face and so ensures uniform flow across the face of the matrix element due to the significant and known uniform pressure drop across the plate.

The above described preferred features are disclosed in our prior application referenced above. In the separator disclosed there, the flow through the matrix elements is unidirectional. It has now surprisingly been found that employing bidirectional flow enables a simplification of separator form without sacrifice of separator efficiency.

The separator is provided with annular flow control elements which close off the spaces between alternate pairs of matrix elements from the supply pipe and close off the remaining spaces from the return pipe.

As a result of the fact that the magnetic separator is very suitable for use with super conducting magnets and, in particular, does not require a short, large diameter magnet with pole pieces, the chamber can readily be removed from the magnet and therefore the arrangement can be employed in a process of the type described in U.S. Pat. No. 4,124,503.

Accordingly in a preferred embodiment, the magnetic separator comprises two chambers and the means for establishing an axial field therein comprises a magnetic field into which the chambers can alternately be positioned such that their axes are aligned with the field.

DISCLOSURE OF PREFERRED EMBODIMENTS

Preferred embodiments of the invention will now be further described by way of example with reference to the accompanying drawings in which:

FIG. 1 is a schematic view of a High Gradient Magnetic Separator;

FIG. 3 is a vertical section through a sketch of a second embodiment of a separator chamber of a magnetic separator;

Figure 2:
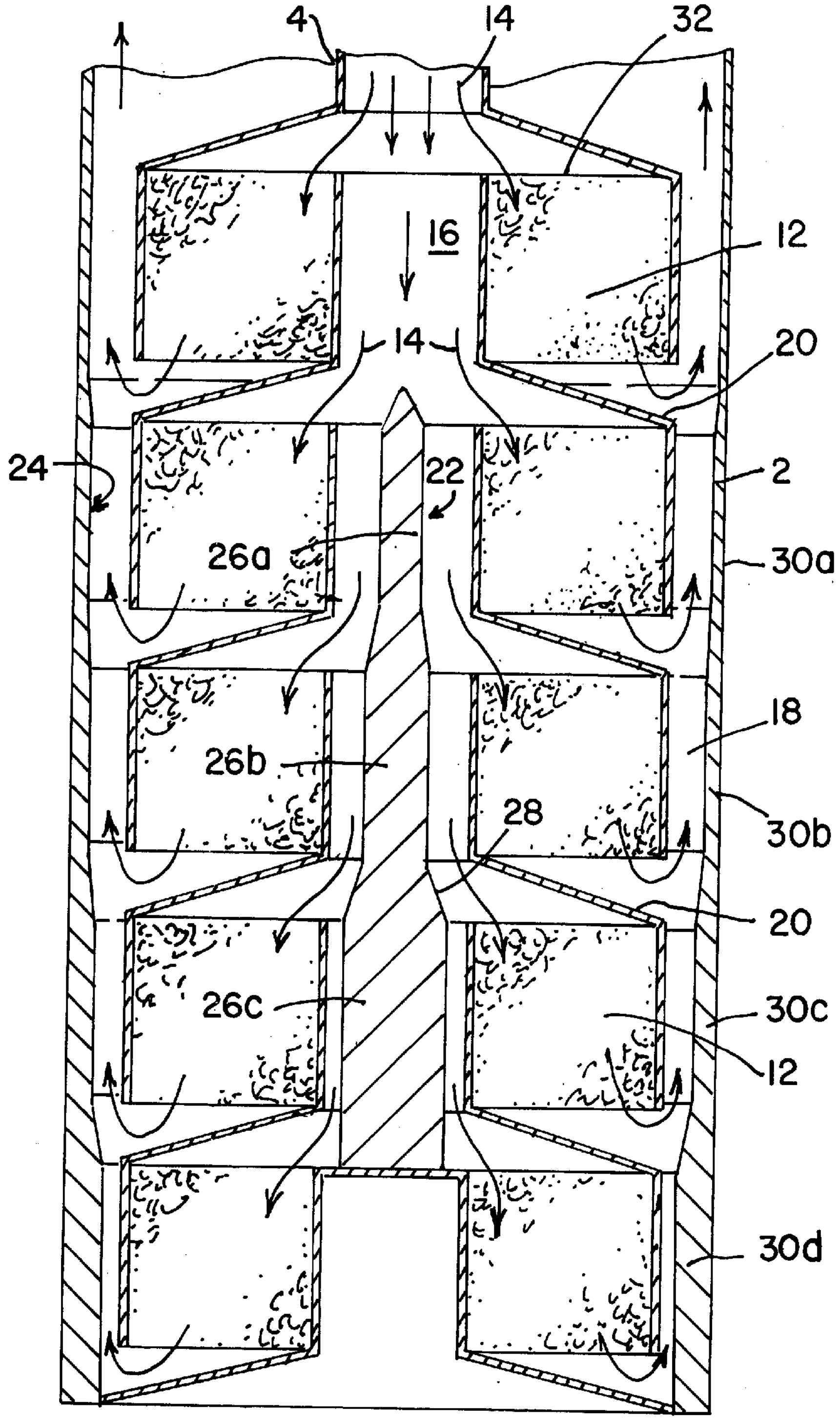
FIG. 2 is a vertical section through one embodiment of a separator chamber of a magnetic separator.
Figure 5A:
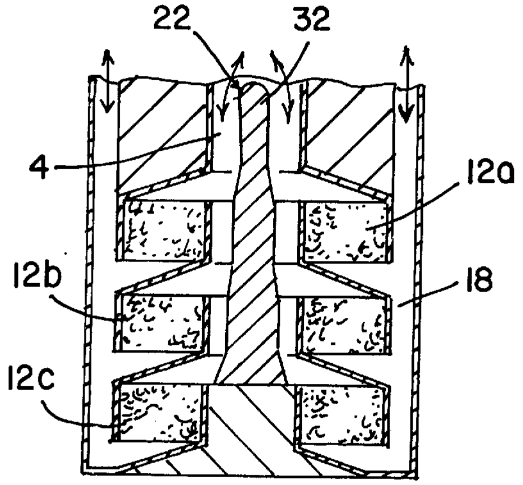
Figure 5B:
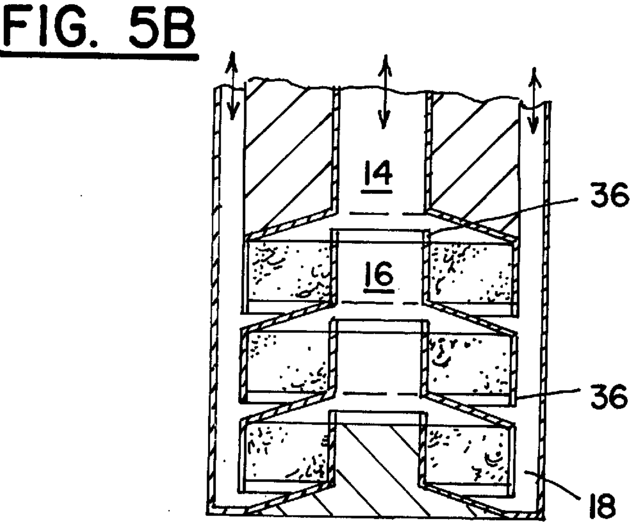
Figure 5C:
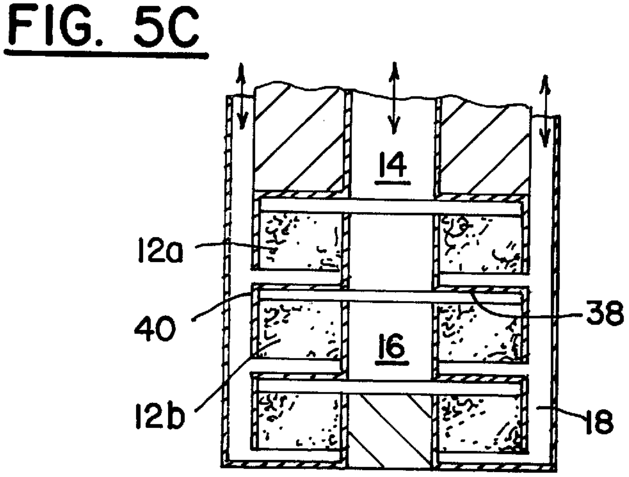
Figure 6:
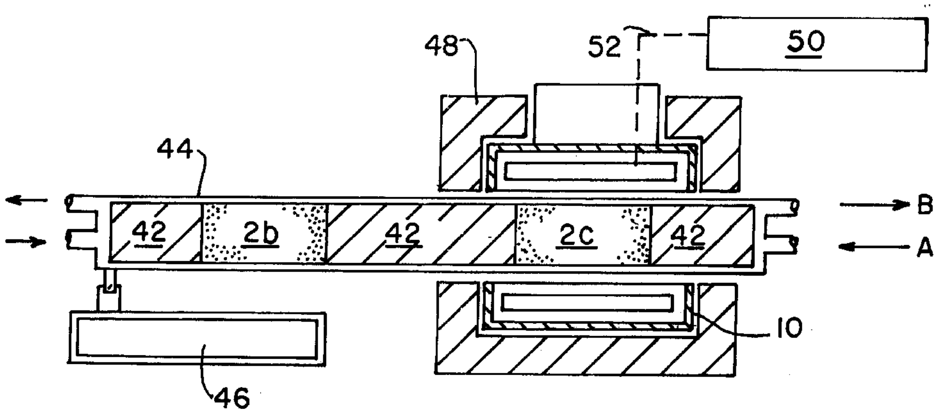
Figure 7:
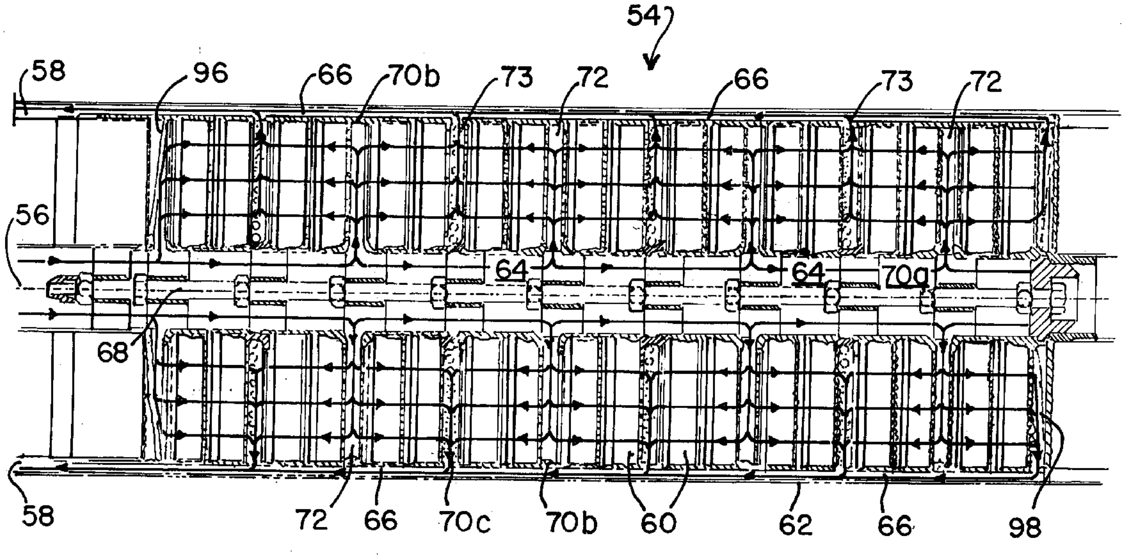
Figure 8:
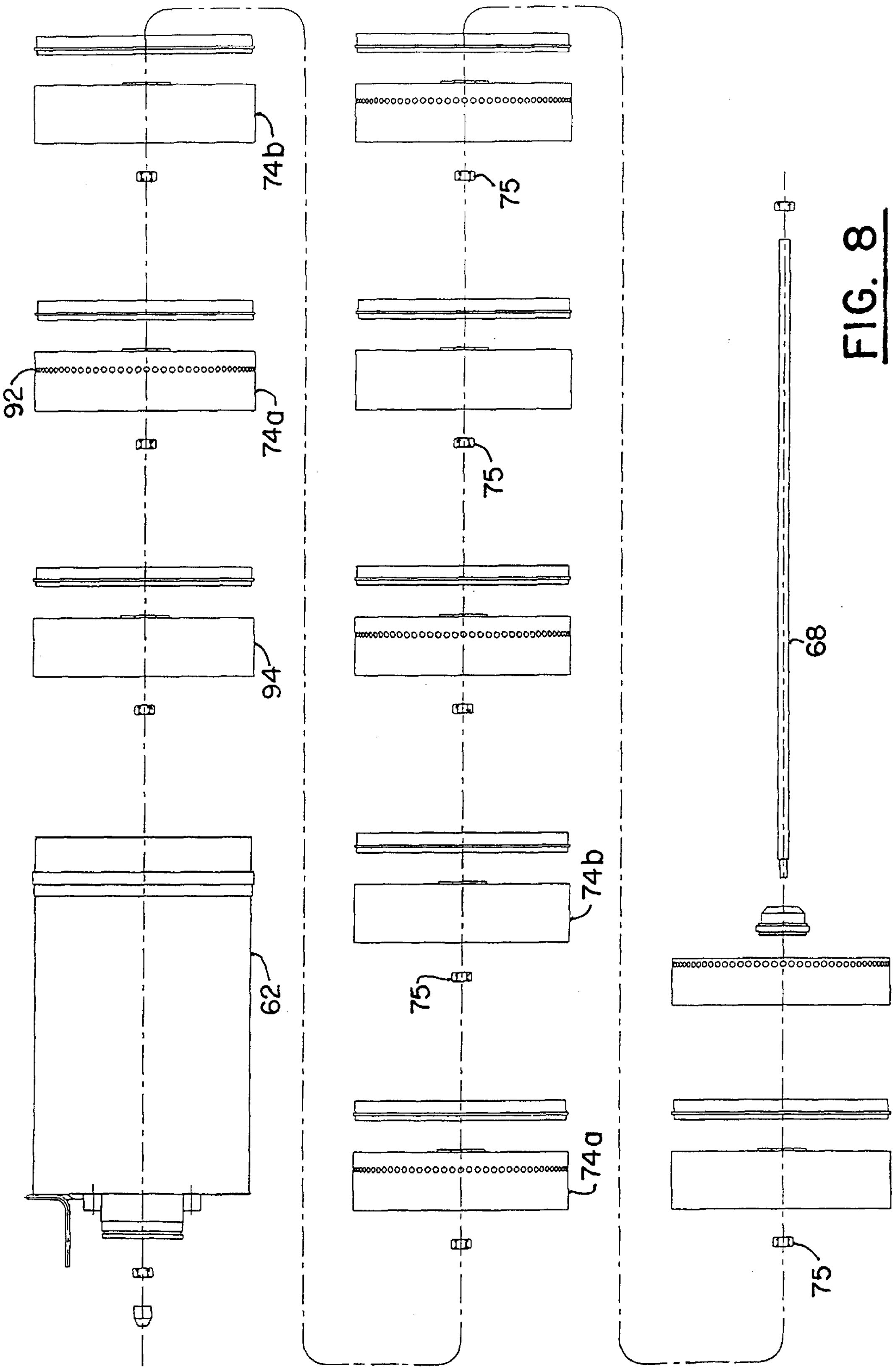
Figure 9:
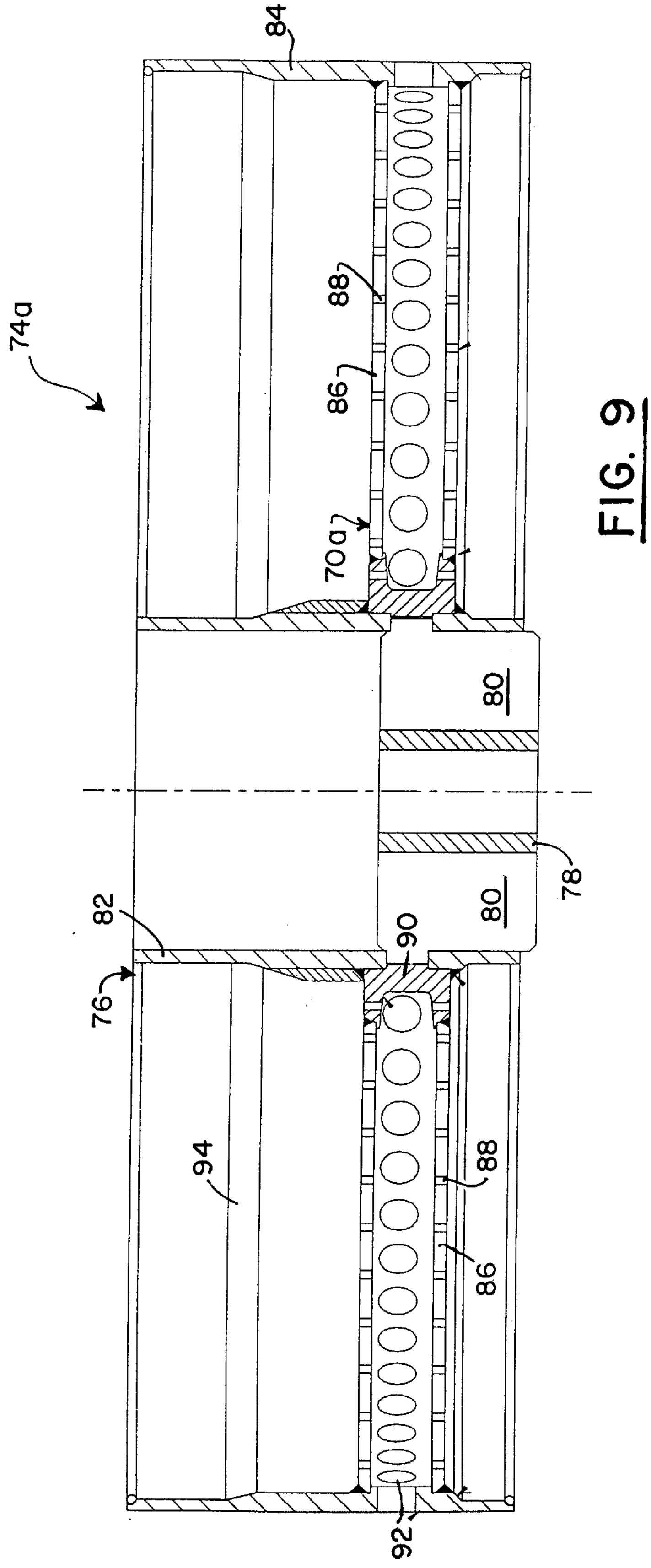
Figure 10:
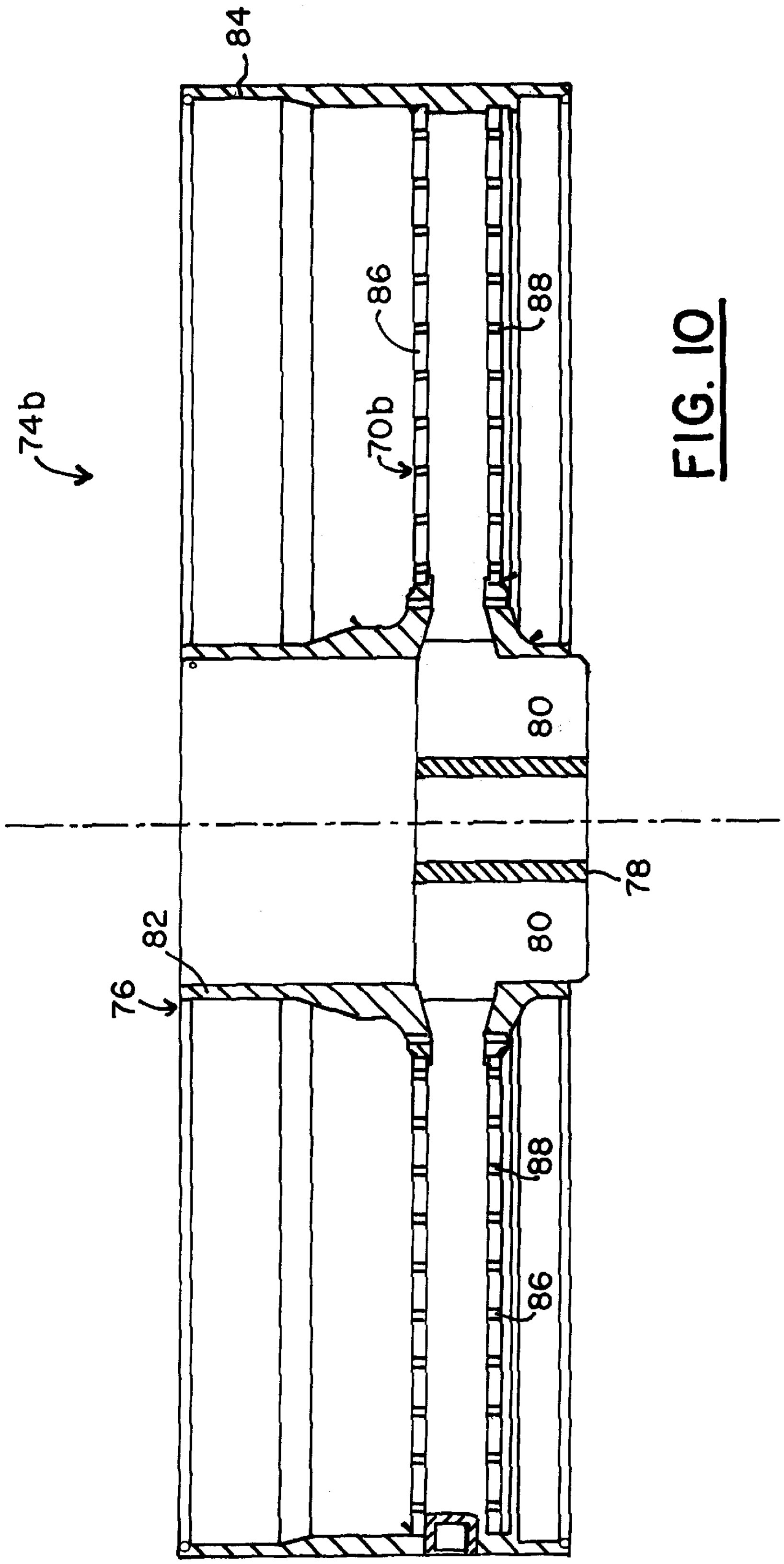

FIGS. 4*a* and 4*b* are sketches which illustrate the feed to each element of the canisters of FIGS. 2 and 3;

FIGS. 5*a*, 5*b* and 5*c* are sketches of alternate arrangements of the canisters of FIGS. 2 and 3;

FIG. 6 is a schematic view of a reciprocating high gradient magnetic separator;

FIG. 7 is a vertical section through a canister of a magnetic separator in accordance with the invention;

FIG. 8 is an exploded view of the canister of FIG. 7 showing the component parts thereof;

FIG. 9 is a sectional elevational view of a first body member employed in the canister of FIG. 7, and, FIG. 10 is a sectional elevational view of a second body member employed in the canister of FIG. 7.

FIG. 1 shows, in schematic form, the basic components of a High Gradient Magnetic Separator, HGMS. These are: a canister 2 with an inlet 4 and an outlet 6, and, a matrix 8 within the canister formed from, for example, wire wool, wire mesh, knitted mesh, steel balls or other particulate or filamentary forms, the material of the matrix being magnetizable. Surrounding the canister 2 is a magnet 10 which may be an electromagnet or a super-conducting magnet, the magnet 10 serving to magnetize the matrix 8. A slurry of mineral ore or clay in water containing magnetizable particles is fed through the inlet 4 so that it passes through the matrix 8 and exits the canister via the outlet 6, as shown by the arrows of FIG. 1. The magnetizable particles in the slurry will be trapped by the matrix 8 and therefore removed from the slurry.

The magnetic field produced by the magnet 10 will generally be in the direction of the axis of the canister 2. If the matrix 8 comprises a single element sized to essentially fill the centre of the canister 2, the flow of the slurry therethrough will be parallel to the magnetic field which will give the greatest effectiveness of magnetizable particle capture. However, in many known devices, the flow of the slurry through the matrix 8 is transverse to the axis of the canister 2 and hence also to the magnetic field. This is achieved by forming the matrix as, for example, a tube and providing flow control means arranged to direct the slurry down into the centre of the tabular matrix 8, radially therethrough and then down between the exterior of the tubular matrix 8 and the canister walls to the outlet 6. The capture effectiveness with this transverse arrangement is less. The reason for its use is to try and maximize the cross-sectional area of the matrix through which slurry flows within the constraints that the length of the canister 2 is greater than its diameter, as discussed above.

The magnetic separator of FIG. 2 has a canister 2 whose length is greater than its diameter but the matrix 8 is so arranged that the cross-sectional area of matrix through which a slurry to be separated is fed is greater than that of known transverse arrangements. Moreover, the slurry is fed through the matrix 8 in a direction parallel to the magnetic field within the canister 2 which will give greatest capture effectiveness.

This is achieved by providing the matrix 8 in the form of a plurality of annular matrix elements 12 stacked one beside the other along the axis of the canister 2. These elements 12 are fed in parallel, i.e., simultaneously, from a slurry stream supplied to the inlet 4 of the canister 2.

It will be appreciated that by providing the multiple matrix elements 12 in place of a solid matrix essentially filling the canister 2, the surface area presented to the feed slurry is increased by a factor equal to the number of elements 12. This will lead to a corresponding increase in processing capacity for a canister of a given size. Whilst there is a loss in matrix volume associated with providing the matrix 8 in the form of elements 12, when compared with a solid cylindrical matrix, this is outweighed by the increase in area compared with known axial flow arrangements as well as by the improvement in capture effectiveness, which results from the axial feed direction, compared to know radial flow arrangements.

The separator chamber shown in FIG. 2 is provided with flow separation means for dividing a stream of fluid containing magnetizable particles supplied to the inlet 4 of the canister 2 into a number of portions and directing each portion axially through a matrix element 12, as illustrated by arrows 14. The flow separation means is essentially constituted by a central supply pipe 16 through the elements 12, and an annular return pipe 18 surrounding the elements 12, each of which pipes 16, 18 has a variable internal cross-section, and branch passage ways from and to the pipes 16, 18 provided by dividing the annular space between each adjacent pair of elements with frustro-conical plates 20. The supply pipe 16 is connected to the inlet 4 whilst the return pipe 18 is connected to an outlet (not shown) which is at the upper end of the canister.

As mentioned above, both the supply pipes 16 and return pipes 18 have variable internal cross-sectional areas. This is achieved by providing each with a divider element, 22, 24. The supply divider element 22 is in the form of a rod of variable cross-sectional area, in particular, it comprises a number of constant diameter regions 26*a, b, c,* each of which is associated with a particular matrix element 12, the constant diameter regions 26*a, b, c* being connected by smoothly tapered expansion sections 28. The diameter of the regions 26*a, b, c* is arranged so that if there are n matrix elements 12 and the area of the supply pipe 16 is x at the uppermost matrix element 12, the area of the supply pipe 16 at each successive matrix element 12 is decreased by an amount equal to 1/(n−1)x. Thus the divider element 22 has n−1 regions which successively are of area 1/(n−1)x, 2/(n−1)x . . . up to x. In fact the divider element 22 need not include a region of cross-sectional area x, that is, a n−1 the element but instead the base of the canister 8 can be suitably shaped to effectively provide this.

The divider element 24 of the return passage 18, which is in the form a tubular liner, also comprises regions 30*a, b, c, d* the thickness of successive ones of which down the canister increases by regular amounts of 1/(n−1)x, where x is the area of the return pipe at the uppermost matrix element 12.

The result of the varying internal cross-sectional are a of the supply and return pipes 16, 18 and in particular the regular decrease in the cross-sectional area of the supply pipes 16 at each successive matrix elements 12 is that the velocity and pressure of fluid in the pipe 16 is constant therealong and the flow to each matrix element 12 is equal. This is further ensured by providing inlet 4 with a cross-sectional area equal to n/(n−1)x.

To increase the stability of the system, the divider element 22 could be connected by an anchoring rod to the inlet 4. Alternatively, the element 22 can extend above the matrix stack as illustrated in FIG. 5*a*. This increases stability and facilitates element location. The area x employed in the calculation of element region size is then between the uppermost end 32 of the element 22 and the sides of the inlet 4.

In the alternative embodiment shown in FIG. 3, the divider elements 22 and 24 are dispensed with and internal cross-section of the supply and return pipes 16, 18 is varied by providing matrix elements 12 of varying size. The inner radii is successive elements 12*a, b, c* progressively decreases from a maximum of element 12*a* to a minimum of zero at element 12*c* which is therefore circular rather than annular. The outer radii of the elements 12*a, b, c* progressively increases. The radii may be arranged to cause a decrease in area of the supply pipe 16 at successive matrix elements equal to that achieved in the embodiment of FIG. 2, that is, a decrease of 1/(n−1)x where x is the area of the supply pipe 16 at the uppermost element 12*a*. The result of this is the same as is achieved by the use of divider element 22 and 24, i.e., the velocity and pressure of fluid in the pipes 16, 18 is constant therealong. The arrangement of FIG. 3 has the advantage that there is a greater matrix volume than with the arrangement of FIG. 2.

To improve flow and prevent it from becoming turbulent guide elements in the form of triangular cross-section rings 33 may be secured at the inner edge of each element 12*a, b, c*, as shown in FIG. 3.

The faces of the matrix elements 12 to which fluid is fed and from which fluid is collected are formed by porous plates 34. This ensures that the flow to the matrix elements 12 is substantially uniform across the faces thereof and therefore that their full capacity is utilised. The reason for this will be explained with reference to FIG. 4*a* which is a sketch showing fluid flow to a closed-ended rectangular section tube with one porous face 34. The pressure at point x will be greater than the pressure at point y and if, instead of the porous plates 34 there were simply a gap, the velocity of the fluid at x would be greater than that at y which would result in uneven flow across the gap. The porous plate 34 produces a pressure differential thereacross and if this is much greater than the difference between the pressure at x and that at y then the velocity of fluid at both these points is approximately the same so that the flow through the porous plate 34 will be even across its extent.

A further improvement in flow uniformity is achieved by the use of the frustro-conical plates 20 illustrated in FIGS. 2 and 3. The effect of these will now be described with reference to the sketch of FIG. 4*b* which shows a rectangular section tube with an angled plate 20 at its end. Consider a plane half way along the wedge shaped region defined by the plate 20, i.e., at Z. The cross-sectional area at Z is half of that at X but since only half the amount of fluid flows through the plane at Z the velocity of fluid at Z is equal to the velocity at X and accordingly, from Bernoulli's equation, the pressure at Z will equal that at X. Even with imperfect conditions the pressures will only slightly differ and accordingly the pressure drop across the porous plates 34 needs only to be slightly larger than the pressure drop along the length of the wedge-shaped region defined by plate 20 to ensure uniform flow through the porous plate 34.

The dividing plates 20 have been described as being simply frustro-conical in shape. This does not however give constant flow velocity. Preferably the plates 20 are formed so that the gap between the surface of a matrix element 12 and the plate 20 thereabove varies with radius according to the following relationship;

$$h = \left( \frac{r^2 - r^2}{r} \right) \frac{Vm}{2Vr}$$

where h is the height at any radius r r is the outer radius

Vm is the velocity of flow of slurry in matrix element 12

Vr is the required radial velocity of slurry flowing from the supply pipe into and through the annular spaces between the elements 12.

FIG. 5*b* illustrates an alternative arrangement to that of FIG. 3 in which the divider elements 22 and 23 are still dispensed with but the matrix elements 12 are not of variable size. In this case, the pipes 16 and 18 are converted to "infinite reservoirs" by increasing the pressure on the fluid at the entry and exit points to the annular spaced between the matrix elements 12. This can be achieved by using ring elements 36 attached to the edges of the elements 12 to restrict the openings between the pipes 16 and 18 and the annular spaces, as is illustrated in FIG. 5*b*.

FIG. 5*c* shows a still further alternative arrangement in which planar plates 38 rather than conical plates 20 are employed to form the feed passageways to and from the from the matrix elements 12. The planar plates 38 are mounted by circular flanges 40 to the elements 12 which restrict the flow in the same way and with the same result as the ring elements 36 described above, with reference to FIG. 5*b*. Even flow through the elements 12 is still produced with the planar plates 38 provided the pressure difference across the entry and exit faces of the elements 12 is sufficiently high. This can be achieved, as described in detail above, by use of porous plates 34 across the faces. Furthermore by graduating the pressure radially across the porous plates 34, e.g., by varying the orifice diameter thereof as a function of radial displacement, a nearly exactly uniform flow distribution thereacross can be produced.

Fluid flowing through the separator from the inlet moves axially along the supply pipe, radially between two elements, axially through the lower of the two elements, radially between that element and the one therebelow and than axially along the return pipe.

The separator chamber shown in FIGS. 2, 3 and 5 provides a large matrix surface area which will give correspondingly high processing capacity. The maximum capacity of each element is utilised. The flow of slurry through the matrix elements 12 is parallel to the direction of the magnetic field axis which will give maximum capture effectiveness and therefore a very clean product. This is achieved within an overall canister arrangement in which the length can be, although this is not essential, greater than the diameter thereof. Accordingly, the arrangement is readily employed with a super-conducting magnet. Furthermore, because the separator can be used with a super-conducting magnet of the type which does not require pole pieces, the canister 2 can readily be removed from the vicinity of the magnet so that it can be replaced with another identical canister whilst the first is being rinsed and the magnetizable particles trapped therein washed out. This provides two benefits: firstly, the magnet is continuously energised which saves power dissipation as the magnet is not being continuously energised and deenergised. Secondly, a super-conducting magnet provides a much higher magnetic field so gives better quality separations. The arrangement is therefore particularly suitable for the type of process described in U.S. Pat. No. 4,124,503.

FIG. 6 illustrates a magnetic separator of the above described type i.e., one where two separator chambers are alternately positioned in the magnetic field of a magnet. In describing FIG. 6, like parts with the separator of FIG. 1 will be given like reference numerals.

The separator comprises two separating chambers 2 which are sandwiched between three compensating chambers 42 the purpose of which will be described further hereinafter. The chambers 2, 42 define together a reciprocating matrix train 44 which is moved by a linear actuator 46. The arrangement allows a first separating chamber 2*a* to be actively engaged in a separation process whilst the second separating chamber 2*b* is outside the high field region created by the magnet 10. The second separating chamber 2*b* can therefore be flushed clean of previously captured magnetic particles. The reciprocating matrix train 44 is periodically moved such that a regenerated separating chamber 2 enters the high field region whilst the previously active separating chamber 2 is moved out for regeneration. Material to be separated is fed in the direction of arrow A whilst the separated products exit in the direction of arrow B.

The magnet 10 is surrounded by an iron yoke 48. This reduces the external magnetic field which allows a short canister train 44 to be used and eliminates any hazards to personal working in the vicinity of the magnet. The power supply for the magnet 10 is shown schematically at 50 whilst the connection leads to the super-conducting coil of the magnet 10 are shown at 52.

The compensating chambers 42 have a matrix packing which is similar in form to that of the separating chambers 2. They serve to reduce the magnetic forces on the matrix elements of the separating chambers 2 as these are reciprocated in and out of the field of the magnet 10.

It will be noted that the reciprocating matrix train 44 is shown in FIG. 6 as reciprocating horizontally. Any of the separating chambers illustrated at FIGS. 2 to 5 above may be employed in the separator of FIG. 6 and therefore references in the description thereof to "upper" and "lower" and "above" and "below" should not be interpreted as limiting the arrangements to ones in which the axis of the separating chamber 2 is vertical. Rather the axis may be horizontal as shown in FIG. 6 and "upper" should be interpreted as meaning closer to the inlet and correspondingly "lower" and "above" and "below".

The separator chambers illustrated in FIGS. 2 to 5 are described in our prior U.S. patent application Ser. No. 08/119,232 referenced above. In all the chambers the flow is unidirectional through the matrix elements 12. It has now been found that an arrangement with bidirectional flow produces equally good results in terms of separation quality but may take a relatively simple form.

FIG. 7 shows a bidirectional flow separator 54 with a central inlet 56 and an annular outlet 58. As with separator chambers 2 illustrated in FIGS. 2 to 5 a plurality of annular matrix elements 60 are positioned side-by-side along the length of the canister 62 of separator chamber 54. Also as with the separator chambers 2 illustrated in FIGS. 2 to 5, the separator chamber 54 includes a central supply pipe 64 and an annular return pipe 66. A central rod 68 is fixed in supply pipe 64 and mounted thereon are annular flow control elements 70. The flow control elements 70 are in two different forms: first flow control elements 70*a* and second flow control elements 70*b*. The first flow control elements 70*a* serve to close off the space between a pair of adjacent matrix elements 60 and the supply pipe 64. The second flow control elements 70*b* close off the space between a pair of adjacent matrix element 60 and the return pipe 66.

The first and second flow control elements 70*a* and 70*b* are alternated along the length of the rod 68. As a result the spaces between alternate pairs of matrix elements 60 constitute supply passageways 72 into which fluid can flow from the supply pipe 64. Offset from the supply passageways 72 by one matrix element 60 are return passageways 73 from which fluid can flow from the matrix element 60 to the return pipe 66.

Fluid fed into inlet 56 therefore flows along supply pipe 64 and into the supply passageways 72 between each alternative pair of matrix element 60. The fluid flows from each supply passageway 72 into the adjacent matrix elements 60 parallel to the axis of canister 62 and so axially through the matrix elements 60 but in opposite directions. Fluid which has flowed through a matrix element 60 is directed to the return pipe 66 by one of the return passageways 73 which alternate with the supply passageways 72.

FIG. 8 is an exploded view of the separator chamber 54 of FIG. 7 showing the component parts thereof. As illustrated by FIG. 8, separator chamber 54 comprises a plurality of body members 74 mounted on central rod 68 by way of nuts 75 within the canister 62. The body members 74 are in two different forms: first body members 74*a* and second body members 74*b*. FIGS. 9 and 10 show, respectively, an enlarged sectional view through a first body member 74*a* and a second body member 74*b*. Both forms of body member 74*a* and 74*b* have certain features in common. They each include an annular member 76 secured to a central tube 78 to define therebetween an annular flow passage 80. The tubes 78 are dimensioned to receive the central rod 68. An annular flow control element 70 is provided within the annular member 76 extending from the inner wall 82 to the outer wall 84 thereof. The space above and below the flow control element 70 is filled with matrix material so that the body members 74 serve to define the matrix elements 60.

Body member 74*a* includes a first flow control element 70*a*. Body element 74*b* includes a second flow control element 70*b*. Both forms of flow control element are, as noted above, annular and comprise a spaced plates 86 with perforations 88 therein to allow fluid to flow from the matrix material above and below the plates 86 to the space therebetween or vice versa depending on whether the flow control element 70 is a first flow control element 70*a* or a second flow control element 70*b*. The first flow control elements 70*a* additionally include a ring shaped closure member 90 which is secured to the inner wall 82 of the annular member 76 and prevents fluid flow from the passage 80 to the space between the plates 86. Fluid flow from that space is, however, allowed by virtue of the fact that the annular member 76 is formed with apertures 92 around the circumference thereof located between the plates 86 of the flow control element 70*a*.

Flow control elements 70*b* are not provided with an inner ring shaped closure member nor are any apertures 92 formed in the annular member 76 of the associated body member 74*b*. Thus fluid can flow from passageway 80 to the space between the plates 86 which is then forced to flow out through the matrix material either side of the plates 86.

Each body member 74 is shaped to receive a matrix support plate 94 which serves to divide the upper space, in the sense of FIGS. 9 and 10, of the annular member 76 in to two regions, each of which may be filled with matrix material. The matrix support plates 94 help prevent compaction of the matrix material.

It will be appreciated from FIGS. 8 to 10 that the passages 80 of the body members 74*a* and 74*b* together form the supply pipe 64. The body members 74*a* and 74*b* include the necessary flow control elements 70*a* and 70*b* and in addition defines spaces for the matrix element 60 which they support.

The perforations 88 provided in the plates 86 within the body members 74*a* and 74*b* help ensure uniform fluid flow across the width of the matrix elements 60. The perforations 88 may have relatively small diameter, for example, 2.5 mm. The perforations 88 preferably provide about 2.5% of the area of the plate 86 for fluid passage.

In the arrangement illustrated in FIGS. 7 to 10, the first portion of fluid which is supplied to inlet 56 is fed to the matrix element 60 adjacent the inlet 56 by a body member 74 which is similar to a second body member 74*b*. The fluid passing to the matrix element 60 adjacent the inlet 56 is guided by a conical plate 96. A second conical plate 98 is provided at the other end of the canister 62 distant from the inlet 56. It, too, similarly helps guide fluid which is passed through the matrix element 60 most distant from the inlet 56, that matrix element 60 being held in a body member 74 which is similar in form to the first body members 74*a*. However the primary purpose of the conical plates 96 and 98 is to provide stability to the multiple body members 74*a* and 74*b* stacked along the canister 62.

The pressure differential between the supply and return passageways 72, 73 distributes fluid supplied to inlet 56 across the matrix elements 60. The pressure differential between the flow supplied to inlet 56 and that returned from outlet 58 may be, say, two to three bar. For example the pressure of fluid supplied to inlet 56 may be three bar whilst the return pressure may be 0.5 bar. It has been found unnecessary to take extra measures to produce an even division of the slurry feed supplied to inlet 56 between each matrix element 60.

It will be noted that the arrangement illustrated in FIGS. 7 to 10 reduces by half the open area available for fluid flow from the supply passage 64 compared with the arrangements illustrated in FIGS. 2 to 5. The effect of the reduction of the open area is to increase the differential pressure and therefore the uniformity of flow to the space between each adjacent pair of elements 60.

A further advantage of employing bidirectional flow is that no plates of the type illustrated at 20 in FIG. 2 and 38 in FIG. 5*c* are necessary thereby reducing the vulnerability of the arrangement to damage because of the high pressures involved.

The arrangement of FIGS. 7 to 10 is particularly preferred for achievement of bidirectional flow due to the relatively simple form of the body members 74*a* and 74*b* and their general similarity which facilitates production.

We claim:

1. A magnetic separator for separating magnetizable particles from a fluid comprising:

a canister having an imperforate peripheral wall, a first end, a second end, an inlet, an outlet, and a central axis extending through said first and said second ends;

a plurality of annular matrix elements having opposite first and second faces that are open fluid flow, said matrix elements coaxially surrounding said central axis and being axially spaced apart from one another;

means for establishing a magnetic field having lines of magnetic flux extending parallel to the central axis of said canister and axially through said matrix elements;

wherein each said matrix element includes a radially outer peripheral wall that is imperforate and a radially inner peripheral wall that is imperforate;

wherein said radially inner walls are coaxially aligned to define a central inlet channel extending axially through all of said matrix elements, said central inlet channel communicating with said outlet;

wherein each said radially outer wall is spaced from an inner surface of said imperforate peripheral wall of said canister and defining an annular outlet flow channel therebetween extending past all of said matrix elements, said annular outlet flow channel communicating with said outlet;

wherein the first face of each said matrix element is positioned closest to the first end of said canister, and the second face of each said matrix elements is positioned closest to the second end of said canister, each space between an adjacent pair of matrix elements having on one side the second face of the element closest to the first end and on the other side the first face of the element closest to the second end;

flow separation means comprising first flow separation means for separating first spaces between alternate pairs of matrix elements from the central inlet channel, second flow separation means for directing flow from the central inlet channel to second spaces offset along the central axis by one matrix element from the first spaces and to the second and first faces either side of each second space, third flow separation means for separating the second spaces from the annular outlet flow channel and fourth flow separation means for directing flow from the second and first faces either side of each first space to the outlet flow channel, whereby the flow through each matrix element is axially between the opposite faces thereof.

2. A magnetic separator as claimed in claim 1, wherein a porous plate is provided across the faces of each matrix element through which fluid flows.

3. A magnetic separator as claimed in claim 2, wherein each porous plate has perforations which comprise 2½% of an area of the porous plate through which fluid flows.

4. A magnetic separator as claimed in claim 1, including annular flow control elements supported side-by-side along the central axis of the canister including first flow control elements providing the first and fourth flow separation means and second flow control elements providing the second and third flow separation means, each first flow control element being spaced from an adjacent first flow control element by a second flow control element.

5. A magnetic separator as claimed in claim 4, wherein a rod is provided in the canister aligned with the central axis of the canister, the flow control elements being mounted on the rod.

6. A magnetic separator as claimed in claim 1, wherein a first plate is provided between the matrix element closest to the canister first end and the first end and a second plate is provided between the matrix element closest the canister second end and the second end to direct fluid respectively into the element closest to the first end from the inlet channel and from the element closest to the second end into the outlet flow channel.

7. A magnetic separator as claimed in claim 1, wherein two separating chambers are provided, the means for establishing an axial field therein comprising a magnet, and wherein the separator includes means for alternatively locating the chambers in the magnetic field of the magnet in such a way that their axes are aligned with the magnetic field.

* * * * *